(12) United States Patent
Handa et al.

(10) Patent No.: US 6,371,259 B1
(45) Date of Patent: Apr. 16, 2002

(54) DRUM BRAKE STRUCTURE FOR A WHEEL OF ALL-TERRAIN VEHICLE

(75) Inventors: Akio Handa; Bunzo Seki, both of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/671,239

(22) Filed: Sep. 28, 2000

(30) Foreign Application Priority Data

Sep. 28, 1999 (JP) .......................................... 11-275156

(51) Int. Cl.$^7$ .......................... F16D 51/00; F16D 65/00; F16J 15/32; F16J 15/16

(52) U.S. Cl. .................................. 188/218 R; 188/18 R; 188/264 R; 188/218 A; 277/361; 277/399

(58) Field of Search .......................... 188/18 R, 218 A, 188/218 R, 17, 18 A, 106 F, 106 A, 264 R, 74, 78; 280/276; 301/105.1; 277/389, 401, 399, 361, 365, 402

(56) References Cited

U.S. PATENT DOCUMENTS

| | | | | |
|---|---|---|---|---|
| 2,263,079 A | * | 11/1941 | Flynn ..................... | 188/218 A |
| 2,747,902 A | * | 5/1956 | Payne et al. | |
| 3,583,533 A | * | 6/1971 | Jones, Jr. et al. ....... | 188/218 R |
| 3,598,417 A | * | 8/1971 | Muller .................... | 188/218 R |
| 4,422,516 A | * | 12/1983 | Yamaura ................ | 188/218 A |
| 4,627,520 A | * | 12/1986 | Matsubayashi et al. ... | 188/18 R |
| 6,293,374 B1 | * | 9/2001 | Tomita et al. ............ | 188/18 R |

FOREIGN PATENT DOCUMENTS

| | | | |
|---|---|---|---|
| JP | 5947530 | * | 3/1984 |
| JP | 6179033 | * | 4/1986 |
| JP | 2150518 | * | 6/1990 |
| JP | 6144328 | * | 5/1994 |
| JP | 7293603 | * | 11/1995 |
| JP | 1030657 | * | 2/1998 |
| JP | 2275 | * | 1/2000 |
| JP | 99199 | * | 4/2001 |
| JP | 99200 | * | 4/2001 |

* cited by examiner

Primary Examiner—Douglas C. Butler
(74) Attorney, Agent, or Firm—Birch Stewart Kolasch & Birch, LLP

(57) ABSTRACT

A real wheel is fitted directly to the brake drum, and cooling fins are provided at the outer surface of the brake drum for dissipating heat. A seal member is fitted to an open edge of the brake drum, and an L-shaped plate for mating with lips of the seal member is fitted to the brake base section attached to the side of the vehicle. A brake shoe is then housed in a space formed between the brake base section and the brake drum. With this arrangement, the number of parts can be reduced compared with the related art. Also, the width of the vehicle can be reduced compared with, for example, fitting a wheel to a hub provided separately from a drum. The drum brake can be housed within the wheel, and the vehicle can be made lightweight. Heat dissipation for the drum brake can also be improved.

20 Claims, 4 Drawing Sheets

DRUM BRAKE STRUCTURE FOR A WHEEL OF ALL-TERRAIN VEHICLE

BACKGROUND OF THE INVENTION

1. Field of the Invention

The present invention relates to a drum brake structure for a wheel of an all-terrain vehicle.

2. Description of the Background Art

A drum brake assembly of the related art for use with a rear wheel is shown in the cross-sectional view of FIG. 4. A drum brake assembly 100 comprises a brake base section 101 taken as a brake panel fitted to a side of the vehicle. Brake shoes 103, 103 are fitted in a freely swingable manner via a support shaft 102 to the brake base section 101. A brake drum 105 is spline-fitted to an axle 104 so as to encompass the brake shoes 103, 103 and generate frictional force with the brake shoes 103, 103. A drum cover 106 is fitted to the brake base section 101 for covering the brake drum 105. An O-ring is provided between the brake base section 101 and the drum cover 106. A seal member 111 is provided between a hub 108 spline fitted to a tip of the axle 104. An oil seal 113 is provided between the axle 104 and the hub 108. This prevents the intrusion of rainwater and soil. A wheel 114 is fitted to the hub 108.

The aforementioned technology has the disadvantage that because the brake drum 105 and the hub 108 are spline-fitted to the wheel 104, the drum cover 106, O-ring 107 and seal member 111 are required in order to make a gap waterproof and dust-proof between the brake drum 105 and the hub 108, and the brake drum 105 itself. This means that the number of parts is substantial and the number of steps required to assemble the drum cover 106, O-ring 107 and seal member 111 increases. Further, the structure surrounding the drum brake is such that the hub 108 is arranged on the outside of the brake drum 105 and the number of parts is therefore substantial.

The brake drum 105 and the hub 108 are heavy, and this is a cause of an increase in the weight of the vehicle, although it would be preferable for the vehicle to be light in weight. With this structure, it is difficult for heat generated at the drum brake 100 to escape to the outside due to the drum cover 106.

SUMMARY OF THE INVENTION

It is therefore an object of the present invention to provide a drum brake structure for a wheel of an all-terrain vehicle which reduces the number of assembly steps by decreasing the number of parts, improving vehicle handling by making the vehicle lighter in weight, and improving heat dissipation.

In order to achieve the aforementioned object, a drum brake structure for a wheel of an all-terrain vehicle is provided such that the wheel may be directly fitted to the brake drum. A fin for dissipating heat is provided at the outer peripheral surface of the brake drum. A seal member is fitted to an opening edge of the brake drum. A plate for abutting a lip of the seal member is fitted to a brake panel which is fitted at a vehicle side. A brake shoe is supplied in a space formed by the brake panel and the drum.

The seal member is fitted to the edge of the opening of the brake drum, and the lip of this seal member abuts with the plate fitted to the brake panel which is fitted to a side of the vehicle so that the drum brake is sealed.

By fitting the wheel directly to the brake drum, the vehicle width can be made narrow compared to, for example, the fitting of a wheel to a hub separate from the drum. Also, the drum brake is housed within the wheel, and the vehicle can be lighter in weight since heavy parts such as the hub can be omitted. Also, because a fin is provided at the outer surface of the brake drum, heat dissipation of the drum brake is improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
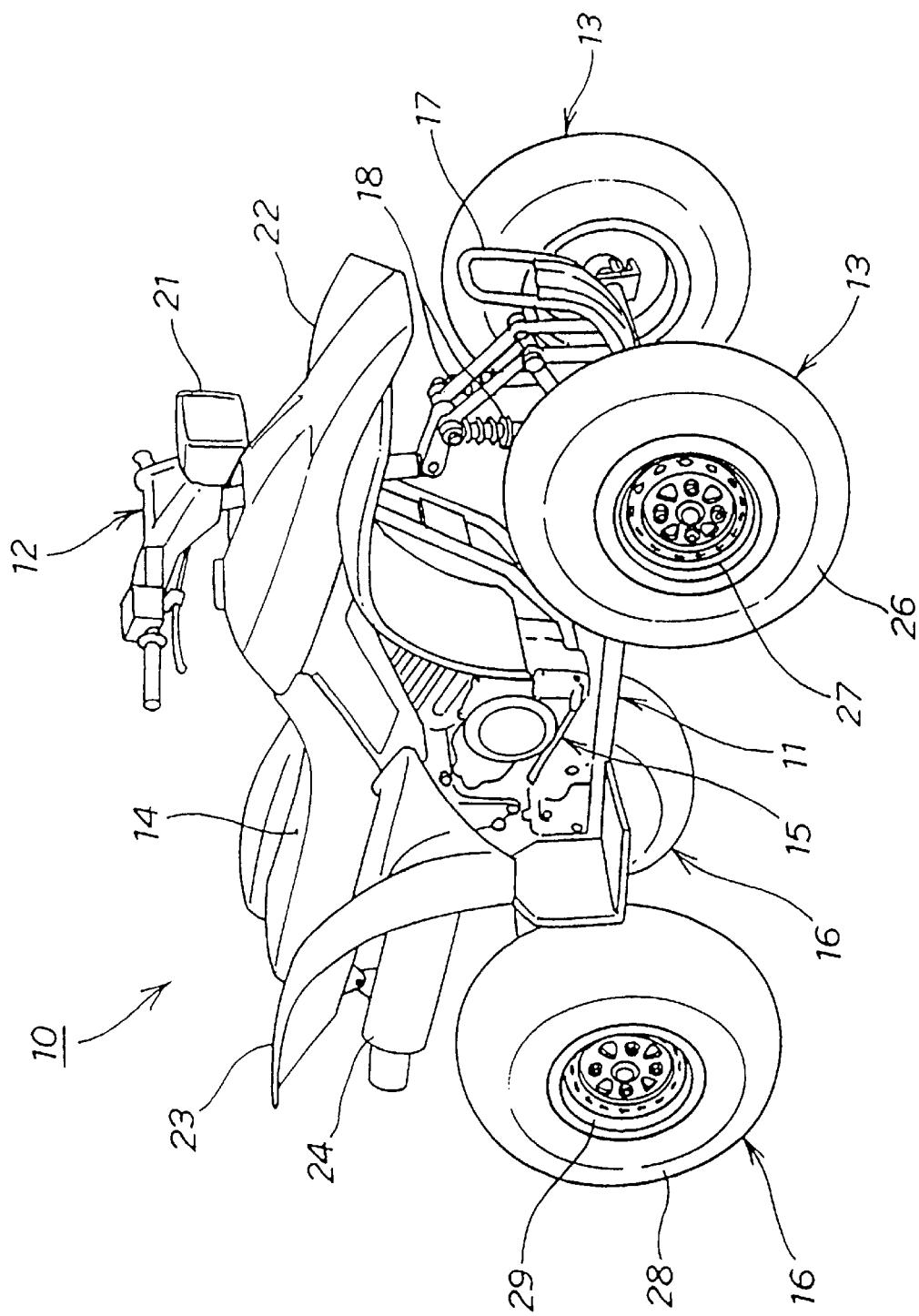
FIG. 1 is a perspective view of an all-terrain vehicle to which the drum brake structure of the present invention is applied.

The present invention will now be described in detail, with reference to the accompanying drawings. An all terrain vehicle (ATV) 10 is particularly suited to all-terrain use in situations requiring good mobility such as farming, cattle breeding, hunting, safety control, and leisure, etc. This is partly because the ATV is light-weight and compact, and therefore provides a small turning circle and easy handling.

The ATV 10 comprises handlebars 12 fitted in a freely rotatable manner to a vehicle 11. Front wheels 13, 13 are steerably coupled to the handlebars 12, A seat 14 is fitted to the upper part of the vehicle 11. A power unit 15 including an engine and transmission is located under the seat 14. Rear wheels 16, 16 are driven by the power unit 15. The ATV 10 also includes a bumper 17, front suspension units 18, 18, a headlamp 21, a front fender 22, a rear fender 23, and an exhaust pipe 24. The front wheels 13 each comprise a tire 26 and a front wheel 27, and the rear wheels 16 each comprise a tire 28 and a rear wheel 29.

Figure 2:
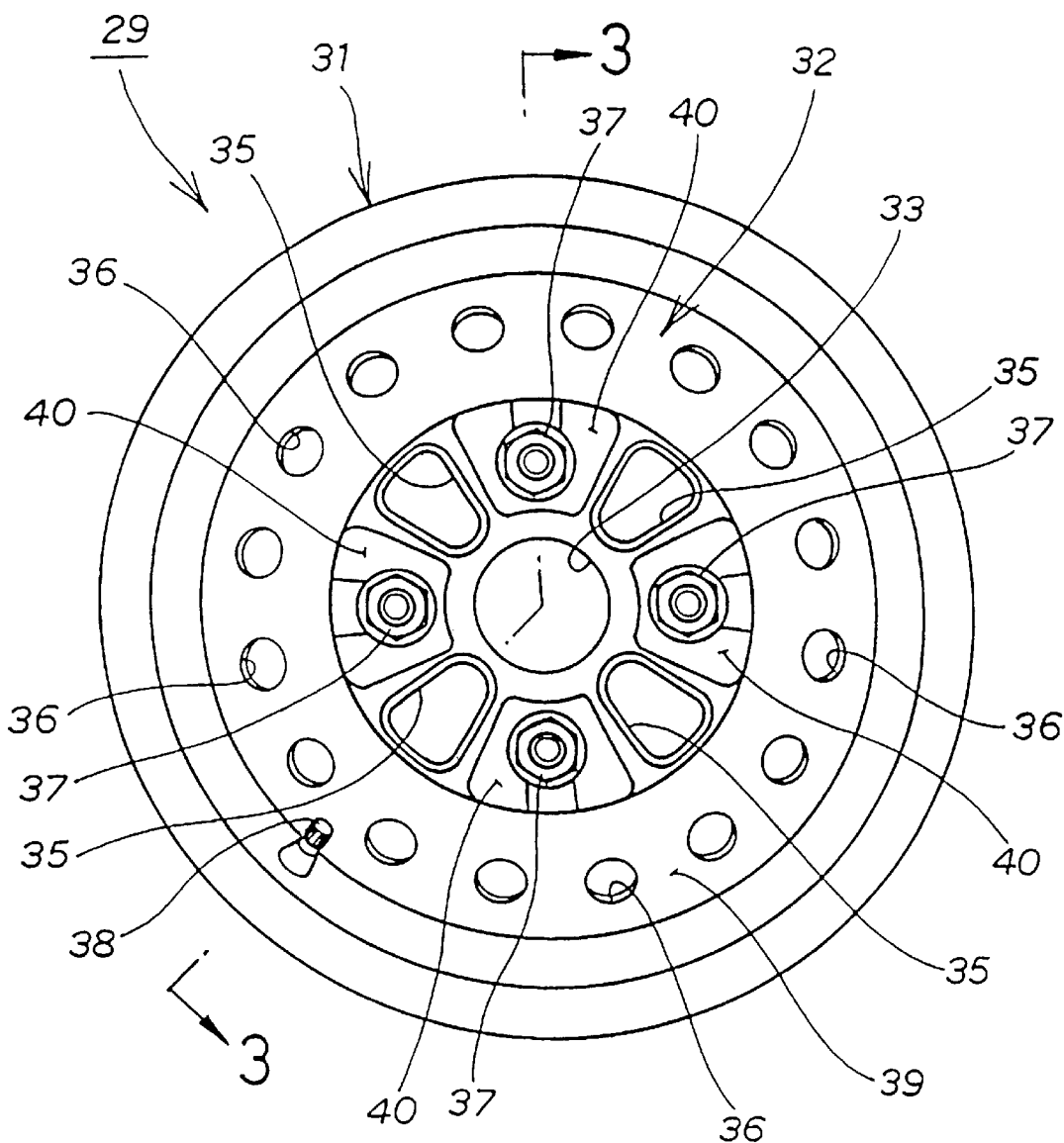
FIG. 2 is a front view of a rear wheel of an all-terrain vehicle of the present invention.

As shown in FIG. 2, the rear wheel 29 includes a rim 31, a disc 32, a center hole 33, a bolt through-hole (to be described later), a plurality of holes 35 to make the wheel light-weight, and decorative holes 36 formed in the disc 32. The rim 31 is fitted to the side of the vehicle using a plurality nuts 37.

A valve 38 is provided for injecting air into the tire 28, as shown in FIG. 1. An annular projection 39 is provided which projects toward the front side at the outer periphery of the discs 32. A plurality of vehicle side fitting sections 40 are provided which project toward the rear for fitting the rear wheel 29 to the side of the vehicle.

Figure 3:
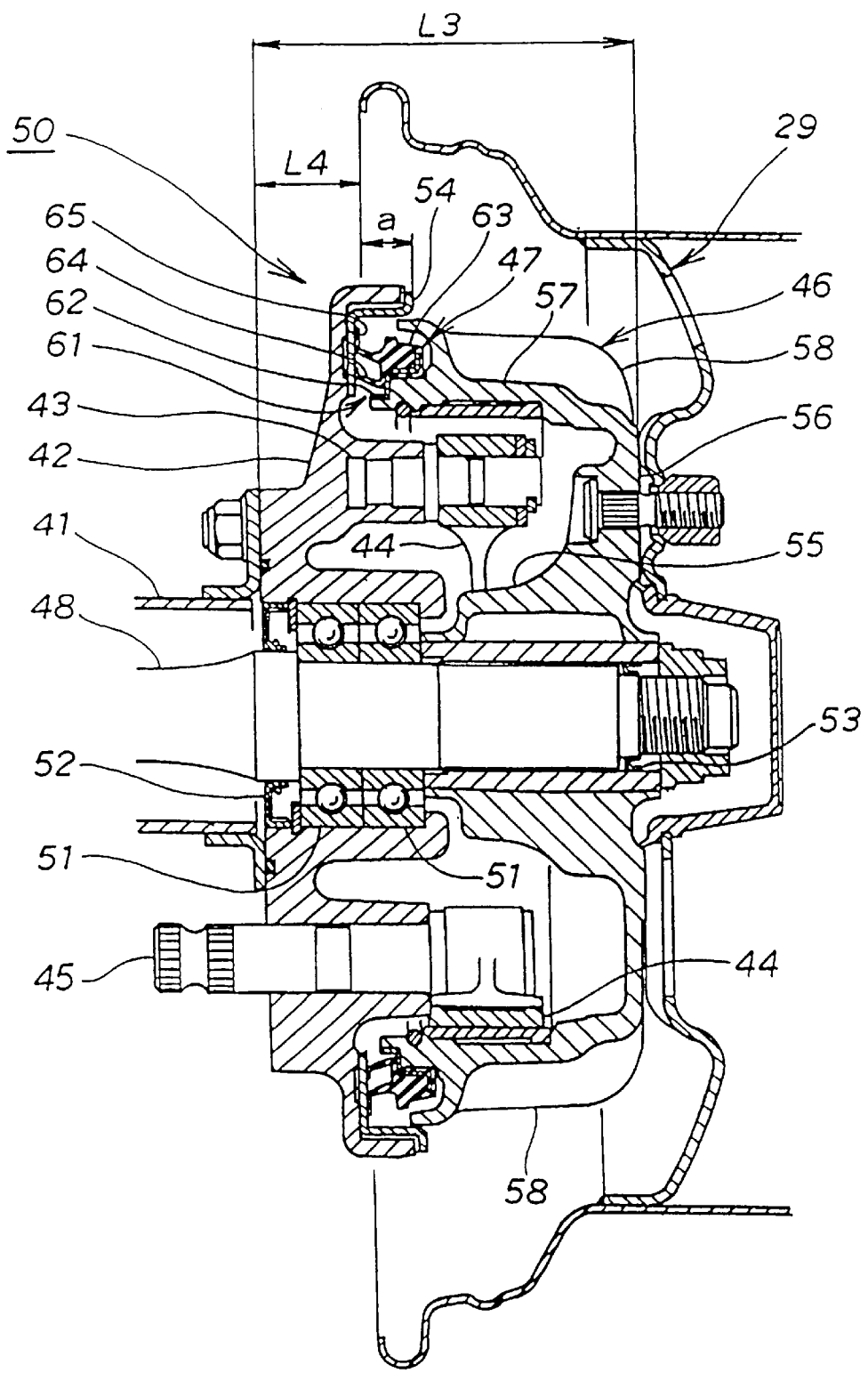
FIG. 3 is a cross-section taken along line 3—3 of FIG. 2.

As shown in FIG. 3, a brake base section 42 taken as a brake panel is fitted to an end section of a tube 41 fitted to the vehicle 11. Brake shoes 44 are fitted in a freely swinging manner via support shafts 43 to the brake base section 42. A swing shaft 45 for driving the brake shoes 44 is fitted to the brake base section 42, and the brake shoes 44 are encompassed by a brake drum 46. A seal member 47 of an oil seal is interposed between the brake drum 46 and the brake base section 42. An end of an axle 48 extending from within the tube 41 is fitted in a freely rotatable manner to a central part of the brake base section 42 via bearings 51. The brake drum 46 is coupled to the axle 48. An oil seal 52 lies between the brake base section 42 and the axle 48, and an oil seal 53 lies between the brake drum 46 and the axle 48. The brake base section 42, support shafts 43, brake shoes 44, swing shaft 45, brake drum 46 and seal member 47 comprise a drum brake 50.

The outer periphery of the brake base section 42 is fitted with an L-shaped steel plate 54. The brake drum 46 includes a boss section 55 coupled with the axle 48, a disc section 56 extending toward the outer diameter from the boss section 55, a cylindrical section 57 rising up from the disc section 56, cooling fins 58 provided at the cylindrical section 57, and a seal-fitting recess 61. The cooling fins 58 are for dissipating heat generated at the drum brake 50 into the atmosphere.

The seal member 47 comprises a reinforcing metal jig 62 fitting into the seal-fitting recess 61 of the drum brake 46, a seal body 63 connected to the reinforcing metal jig 62, and lips 64, 65 projecting from the seal body 63. The lips 64 and 65 abut with the L-shaped plate 54 of the brake base section 42 in the direction of extension of the axle 48.

In this way, it is possible for just the seal member 47 provided between the brake base section 42 and the brake drum 46 to provide the seal assembly for the drum brake 50. The number of parts can therefore be reduced compared with the related art where a drum cover, O-ring and oil seal are required, and the number of processes required for assembling the seal assembly can therefore be reduced.

Further, by utilizing a structure where the seal member 47 is fitted to the edge of the opening of the brake drum 46 in such a manner that the lips 64, 65 of the seal member 47 abut with the L-shaped plate 54 of the brake base section 42, it is difficult for heat generated as a result of friction with the brake shoe 44 to be transmitted as far as the lips 64 and 65 on the side of the L-shaped plate 54. In this case, heat is transmitted to the seal body 63 coming directly into contact with the brake drum 46. However, increases in the temperature of the seal body 63 are relatively small, which is advantageous with respect to heat from the lips 64 and 65 of a relatively small volume.

By utilizing this configuration where the L-shaped plate 54 abuts with the lips 64, 65 of the seal member 47, when the brake base section 42 is made of cast metal for example, sealing can be made even more effective when the lips 64, 65 abut with the L-shaped plate 54 which can be less coarse than the cast metal of the base brake section, it is difficult to subject the lips 64, 65 to wear, and the lifetime of the lips 64, 65 can be extended.

Further, when the ATV 10 is running on any terrain, outer forces in the direction of the axle acts on the brake drum 46 via the rear wheels 29 of the rear wheels 16, the brake drum 46 shakes about the section for fitting to the axle 48 and the brake drum 46 comes away from the brake base section 42.

However, at the rear wheels 16 in particular, the ground load during braking is small compared with that of the front wheels 13. Therefore, the braking force of the drum brake 50 is set to be smaller than for the front wheels 13 so that the inner diameter of the brake drum 46 making contact with the brake shoe 44 becomes smaller and the diameter of the seal member 47 fitted to the brake drum 46 becomes smaller. The distance the lips 64, 65 of the seal member 47 come away from the L-shaped plate 54 of the brake base section 42 is therefore small even when the brake drum 46 comes away from the brake base section 42 and reductions in the sealing properties of the seal member 47 can therefore be suppressed.

Figure 4:
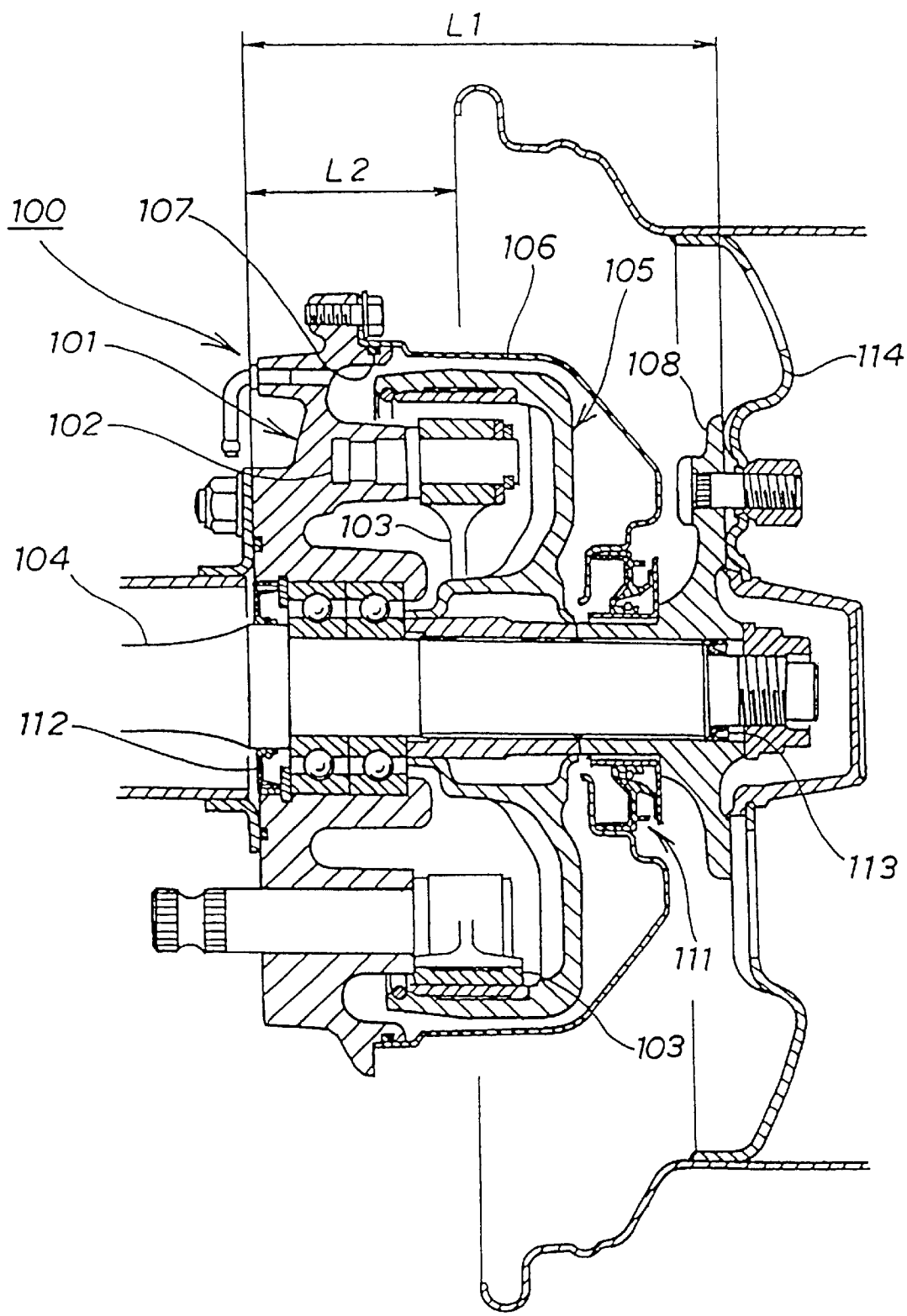
FIG. 4 is a cross-section illustrating a related rear wheel drum brake.

With the drum brake 100 of the related art shown in FIG. 4, L1 is a distance from the back surface of the brake base section 101 to the wheel fitting surface of the hub 108, and L2 is a distance from the back surface of the brake base section 101 to an inner end section of the wheel 114. In the present embodiment shown in FIG. 3, L3 is a distance from the back surface of the brake section 42 of the drum brake 50, and L4 is a distance from the back surface of the brake base section 42 to an inner end section of the rear wheel 29. Comparing FIGS. 3 and 4 reveals that L3<L1, and L4<L2.

In this embodiment, L3<L1 because a structure is adopted where the hub 108 of the related art is omitted and the rear wheel 29 is fitted directly to the brake drum 46. As a result, the width of the ATV 10 can be made smaller and the turning circle can be improved. Further, L4<L2 because L3<L1. Therefore, although housing of the drum brake 100 within the wheel 114 was not possible in the related art, in this embodiment it is possible to house the drum brake 50 within the rear wheel 29.

In this embodiment, the rear wheel 29 and the drum brake 50 side overlap by just a length a. A structure can therefore be adopted where the drum brake 50 is not influenced by flying stones or dust, and flying stones do not directly collide with the seal member 47 of the drum brake 50 so that damage to the seal member 47 can be prevented.

The drum brake 50 of this embodiment also combines the function of fitting the wheel performed by the hub 108 in the related art. By adopting this drum brake structure, the ATV 10 no longer has the hub 108 and can therefore be made more lightweight. When the ATV is traversing over any kind of terrain, the force required to steer is small, vehicle response is improved, the steering feels light, and the ease with which the vehicle can be driven is improved.

As described, with the drum brake structure of the present invention, the rear wheel 29 is fitted directly to the brake drum 26, and cooling fins 58 for dissipating heat are provided at the outer surface of the brake drum 46. A seal member 47 is fitted to an open edge of the brake drum 46, and an L- shaped plate 54 for adjoining with the lips 64, 65 of the seal member 47 is fitted to a brake base section 42 attached to the side of the vehicle 11. The brake shoe 44 is then housed in a space formed between the brake base section 42 and the brake drum 46.

In the above configuration, the seal member 47 is fitted to the open edge of the brake drum 46 and the lips 64, 65 of this seal member 47 touch the L-shaped plate 54. Sealing of the drum brake 50 can therefore be achieved using only the seal member 47. Accordingly, the number of parts can be reduced with regard to the drum cover, O-ring and oil seal of the related art, and the number of the parts involved in putting together the sealing assembly can be reduced as a result.

Because the rear wheel 29 is fitted directly to the brake drum 46, the width of the vehicle can be made small compared to the related art where a wheel is fitted to a hub provided separately from the drum. Further, the drum brake 50 can be housed within the rear wheel 29 and the vehicle can therefore be made light in weight because heavy objects such as the hub can be omitted. Heat dissipation of the drum brake 50 can also be improved because cooling fins 58 for dissipating heat are provided at the outer surface of the brake drum 46.

The drum brake for the front wheels has the same basic sections and same configuration as the drum brake 50 for the rear wheels, and therefore brings about the same operation and effects. The seal member 47 shown in FIG. 3 is provided with two lips 64, 65, but the present invention is not limited to this number and shape of the lips 64, 65.

With the drum brake structure for an all terrain vehicle of the present invention, the seal member is fitted to the opening edge of the drum and the lips of this seal member abut with the plate fitted to the brake panel which is fitted to the side of the vehicle. The drum brake can therefore be sealed just using the seal member, and the number of parts can be reduced with respect to the drum cover, O-ring and oil seal of the related art. As a result, the number of steps involved in putting together the seal assembly can be reduced.

By fitting the wheel for an all-terrain vehicle directly to the brake drum, the vehicle width can be made narrow compared to, for example, the fitting of a wheel to a hub separate from the drum. The drum brake can be housed within the wheel, and the vehicle can be lighter in weight due to the heavy parts such as the hub being omitted.

Further, a fin is provided for heat dissipation at the outer surface of the drum, and heat dissipation of the drum brake can therefore be improved.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A drum brake structure for a wheel of an all-terrain vehicle, said drum brake structure comprising:
   a brake drum directly attachable to the wheel, said brake drum having a substantially circular peripheral rim and an annular flange located at said substantially circular peripheral rim;
   a fin provided on an outer peripheral surface of said brake drum for dissipating heat;
   a seal member provided in an opening edge of said brake drum, said seal member including a first lip;
   a brake panel fitted at a vehicle side, said brake panel having a substantially circular periphery and an annular overhang located at said substantially circular periphery, said annular overhang of said brake panel overlying said annular flange of said brake drum to thereby create a labyrinth structure between said brake panel and said brake drum;
   a plate fitted to said brake panel for abutting said lip of said seal member for sealing a gap between said rim of said brake drum and said plate of said brake panel; and
   a brake shoe provided in a space formed by said brake panel and said brake drum.

2. The brake drum according to claim 1, wherein said brake shoe is pivotally attached to said brake panel and engagable with said brake drum.

3. The brake drum according to claim 1, wherein said seal member is fixedly attached to said brake drum and rotatable therewith.

4. The brake drum according to claim 1, wherein said substantially circular peripheral rim includes a recess therein, and said seal member includes a main body portion located at least partially within said recess of said brake drum, said first lip is an annular lip extending from said main body portion in a direction away from said recess, a second annular lip extending from said main body portion in a direction away from said recess, and a continuous annular space separating said first annular lip from said second annular lip.

5. A drum brake structure comprising:
   a brake base section having a substantially circular periphery and an annular overhang located at said substantially circular periphery;
   a brake drum rotatably supported with respect to said brake base section, said brake drum having a substantially circular peripheral rim and an annular flange located at said substantially circular peripheral rim, said annular overhang of said brake base section overlying said annular flange of said brake drum to thereby create a labyrinth structure between said brake base section and said brake drum;
   an annular seal member provided at said rim of said brake drum, said annular seal member sealing a gap between said rim of said brake drum and said periphery of said brake base section; and
   at least one brake shoe pivotally attached to said brake base section and engagable with said brake drum.

6. The brake drum according to claim 5, wherein said rim of said brake drum includes a recess for receiving said annular seal member therein.

7. The brake drum according to claim 5, further comprising a plate fitted to said brake base section at said periphery for abutting with said annular a seal member.

8. The brake drum according to claim 5, wherein said annular seal member includes at least one lip engagable with said brake base section.

9. The brake drum according to claim 5, wherein said annular seal member includes a pair of lips engagable with said brake base section, said pair of lips being spaced apart by a continuous annular space.

10. The brake drum according to claim 5, said brake drum including at least one fastener for directly attaching a wheel to said brake drum.

11. The brake drum according to claim 5, further comprising at least one fin provided on an outer peripheral surface of the brake drum for dissipating heat therefrom.

12. The brake drum according to claim 5, wherein said annular seal member is fixedly attached to said brake drum and rotatable therewith.

13. The brake drum according to claim 5, wherein said substantially circular peripheral rim of said brake drum includes a recess therein, and said annular seal member includes a main body portion located at least partially within said recess of said brake drum, a first annular lip extending from said main body portion in a direction away from said recess, a second annular lip extending from said main body portion in a direction away from said recess, and a continuous annular space separating said first annular lip from said second annular lip.

14. A drum brake structure comprising:
   a brake base section having a substantially circular periphery and an annular overhang located at said substantially circular periphery, said brake base section including a plate fitted thereto at said periphery;
   a brake drum rotatably supported with respect to said brake base section, said brake drum having a substantially circular peripheral rim and an annular flange located at said substantially circular peripheral rim, said annular overhang of said brake base section overlying said annular flange of said brake drum to thereby create a labyrinth structure between said brake base section and said brake drum, said substantially circular peripheral rim including a recess therein;

an annular seal member provided in said recess of said brake drum, said annular seal member including a first lip engagable with said plate for sealing a gap between said rim of said brake drum and said periphery of said brake base section; and at least one brake shoe pivotally attached to said brake base section and engagable with said brake drum.

15. The brake drum according to claim 14, wherein said annular seal member includes a second lip engagable with said plate of said brake base section, said second lip being spaced apart from said first lip by a continuous annular space.

16. The brake drum according to claim 14, said brake drum including at least one fastener for directly attaching a wheel to said brake drum.

17. The brake drum according to claim 14, further comprising at least one fin provided on an outer peripheral surface of the brake drum for dissipating heat therefrom.

18. The brake drum according to claim 14, wherein said annular seal member is fixedly attached to said brake drum and rotatable therewith.

19. The brake drum according to claim 14, wherein said annular seal member includes a main body portion located at least partially within said recess of said brake drum, a first annular lip extending from said main body portion in a direction away from said recess, a second annular lip extending from said main body portion in a direction away from said recess, and a continuous annular space separating said first annular lip from said second annular lip.

20. The brake drum according to claim 19, wherein said first and second annular lips engage said plate during rotation of said brake drum.

* * * * *